United States Patent Office 2,804,435
Patented Aug. 27, 1957

2,804,435

PROCESS FOR PREPARING EXPANDED ORGANIC POLYMERIC MATERIALS AND A BLOWING AGENT THEREFOR

Ronald A. Reed, Quorn, England, assignor, by mesne assignments, to Whiffen and Sons Limited, London, England, a British company No Drawing. Application September 20, 1954, Serial No. 457,302

Claims priority, application Great Britain October 14, 1953

4 Claims. (Cl. 260—2.5)

This invention relates to a process for the production of organic plastic materials and shaped articles in expanded or cellular form, and more particularly of such organic plastic materials as have a high melting point or a high hardening temperature and shaped articles made therefrom.

We have found that azodicarbonamide,

$NH_2.CO.N:N.CO.NH_2$ is a very suitable blowing agent for such plastics as melt above 120° C. or require a temperature of from 150° to 230° C. for hardening.

The pure compound decomposes with gentle evolution of gas at about 230° C., but a temperature of about 205° C. is effective if the azodicarbonamide is mixed with a small proportion, e. g. 1–5%, preferably 1–2%, by weight, of its reduction product, biurea,

$NH_2.CO.NH.NH.CO.NH_2$ and the vigour of gas evolution is in these circumstances greatly increased. In certain circumstances, when admixed with plastic materials, decomposition can occur at as low a temperature as 170° C.

According to the present invention, azodicarbonamide alone or in admixture with biurea is incorporated with an organic plastic material which melts above 120° C. or which requires a hardening temperature of from 150° C. to 230° C., and the mixture is heated to a temperature at which decomposition of the addendum and hardening of the plastic occur, whereby a hardened cellular plastic is obtained.

The plastic materials to be expanded by the process of the invention are those which in the range 150°–180° C. have a suitable viscosity during the hardening process (e. g. polythene or partially gelled polymers or co-polymers of vinyl chloride) and those which can be cured by gradual heating to 150°–230° C. (e. g. an epoxy-resin with an acid anhydride hardener). The process is unsuitable for resins of melting-point below 120° C.

The blowing agent of the invention may be mixed with a suitable moulding powder and heated to an appropriate temperature in a sealed mould; or the mixture may be moulded by extrusion at the requisite temperature, the expansion in this case taking place during extrusion.

The decomposition of azodicarbonamide yields oxamide and nitrogen, the theoretical volume of gas evolved being 193 ml. per gram of azodicarbonamide—which is appreciably higher than that given by most of the blowing agents hitherto used. The residual oxamide is non-volatile, white and odourless, and the gas evolved, i. e. nitrogen, is ideal for expansion purposes.

The invention is illustrated but not limited by the following examples, in which the parts are parts by weight.

*Example I*

10 parts of azodicarbonamide and 0.2 part of biurea, both finely powdered, are mixed thoroughly in a mixing machine of standard type with 50 parts of polyvinyl chloride, 50 parts of tricresyl phosphate plasticiser and 0.5 part of a stearate stabiliser.

The mixture is filled into moulds, which are then sealed and heated to 180° C. The moulds are cooled and opened and the product is removed. There are obtained greatly expanded moulded products, which are uniformly and finely cellular and have no unpleasant odour.

*Example II*

10 parts of azodicarbonamide and 0.2 part of biurea, both finely powdered, are incorporated in a mixing machine with 50 parts of compounded polythene and 40 parts of dibutyl phthalate. The mixture is heated in sealed moulds to 205° C. and after cooling and removing from the moulds shaped products are obtained which are uniformly and finely cellular, of light density and free from unpleasant odour.

I claim:

1. A process which comprises incorporating a gas-producing composition comprising a mixture of azodicarbonamide and from 1% to 5% of biurea based upon the weight of the azodicarbonamide into a polymeric material selected from the group consisting of polyethylene and a partially gelled homo-polymeric vinyl chloride and heating the resultant material to a temperature in the range 150° to 230° C.

2. A process which comprises incorporating into a partially gelled homo-polymeric vinyl chloride a gas-producing composition comprising a mixture of azodicarbonamide and from 1% to 5% of biurea based upon the weight of the azodicarbonamide, and heating the resultant material to a temperature in the range 150° to 230° C.

3. A process which comprises incorporating into polyethylene a gas-producing composition comprising a mixture of azodicarbonamide and from 1% to 5% of biurea based upon the weight of the azodicarbonamide, and heating the resultant material to a temperature in the range 150° to 230° C.

4. A gas-producing composition which comprises a mixture of azodicarbonamide and biurea, wherein the amount of biurea is at least 1% and not more than 5% of the amount of azodicarbonamide.

References Cited in the file of this patent

UNITED STATES PATENTS

| | | |
|---|---|---|
| 2,261,459 | Cooper et al. | Nov. 4, 1941 |
| 2,676,928 | Frank | Apr. 27, 1954 |
| 2,707,707 | Schwarz | May 3, 1955 |

FOREIGN PATENTS

| | | |
|---|---|---|
| 871,835 | Germany | Mar. 26, 1953 |

OTHER REFERENCES

Stevens et al.: Ind. Chemist (London), September 1951, vol. 27, Issue 320, pages 391 through 394.